A. J. MORSE.
Hose-Coupling.
No. 166,130.  Patented July 27, 1875.
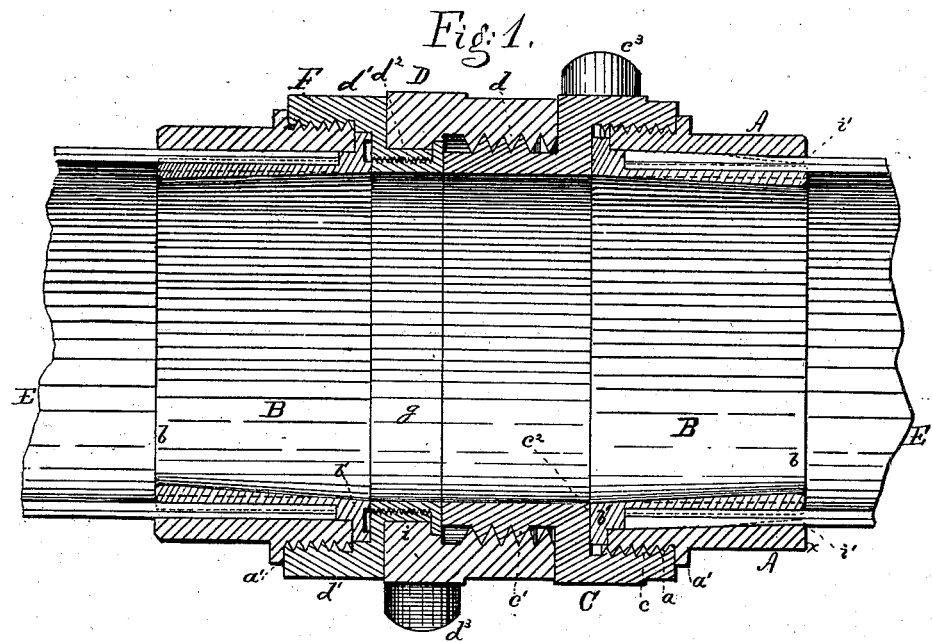
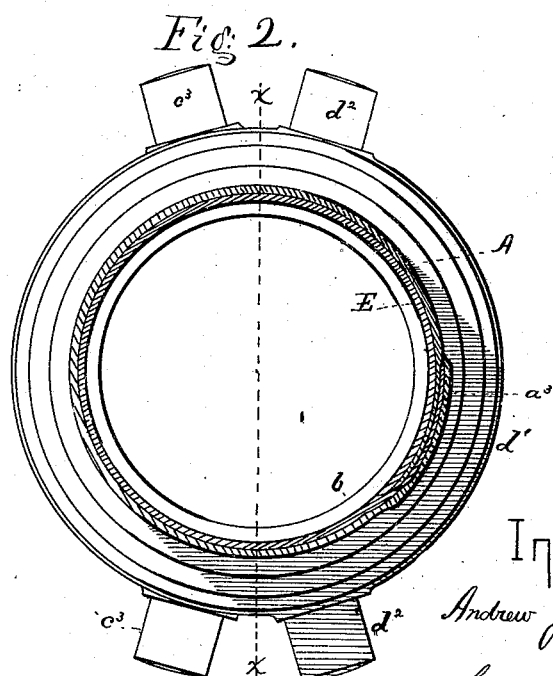
Witnesses.
S. B. Kidder
L. H. Latimer
Inventor.
Andrew J. Morse
per Crosby & Gregory
Att'y.

UNITED STATES PATENT OFFICE.

ANDREW J. MORSE, OF BOSTON, MASSACHUSETTS.

IMPROVEMENT IN HOSE-COUPLINGS.

Specification forming part of Letters Patent No. 166,130, dated July 27, 1875; application filed December 22, 1874.

*To all whom it may concern:*

Be it known that I, ANDREW J. MORSE, of Boston, in the county of Suffolk and State of Massachusetts, have invented an Improved Hose-Coupling, of which the following is a specification:

My invention relates to improvements in couplings for hose.

Hose used in connection with fire-engines and for other purposes is made of leather, of india-rubber, or of combinations of rubber and textile materials. Hose is made in lengths, and these lengths are joined together by couplings; and the object of my invention is to produce a coupling which shall grasp the end of the hose so firmly that it cannot be moved or disturbed in its position by pressure from within the hose, such pressure being in degree all that a fire-engine ever exerts.

My invention consists in a holder for the end of the hose, composed of a binding-ring applied to the outside of the hose, and an inner flanged and tapering ring constructed as hereinafter described, applied to the inside of the hose within the binding-ring. This inner ring may be expanded against the inner side of the hose to hold it firmly between the outer side of the inner ring and the inner side of the binding-ring, or the binding-ring may be compressed into smaller space and compress the hose from the outer side; also, in the combination, with a screw-threaded binding and an inner ring, firmly secured to the end of the hose, as hereinafter described, of a screw-ring, disconnected and removable from both the inner and binding rings, adapted to serve as the coupling-member between the joints or lengths of hose; also, in the combination, with the binding-ring, of an inner flange, $d$, and tapering ring, constructed as hereinafter described, to cap and form an immovable holder for the end of the hose, and to permit the removal of the screw-threaded working-sections of the coupling without disturbing or loosening the attachment of the binding and inner rings, which are contracted or expanded to firmly grasp the hose; also, in a binding-ring provided with a recess or channel to receive the joint, seam, or lap of the hose.

Figure 1 represents my improved hose-coupling in section, and Fig. 2 represents an end view thereof.

My improved coupling is composed of a number of parts, as herein described, and such parts are as follows, viz: A represents the binding-ring, made of any ductile or compressible metal, and having a flange or collar, $a'$, beyond which is a screw-thread, $a$. B represents the inner ring, made of any ductile metal, made smaller than and so as to fit within the binding-ring, and provided with a flange, $b'$, and with the edge $b$ preferably thicker than at or near the flange $b'$. This ring B is made somewhat tapering, growing smaller toward the end $b$. C represents a screw-ring or coupling-section, having internal screw-threads $c$ to fit screw-thread $a$ on A, external screw-threads $c^1$, to receive screw-threads on inside of loose ring D, forming part of coupling-section F, and the part C has a shoulder, $c^2$, to meet the flanged portion $b'$ of B. This coupling-section has spanner-projections $c^3$, and the loose ring D has spanner-projections $d^3$. So far I have described the right-hand end of the coupling. (See Fig. 1.)

The parts B A at the left-hand end are the same as at the right; but instead of a screw-ring or coupling-section like C, I employ a coupling-section or screw-ring, F, having an internal screw-thread to engage external screw-threads on the binding-ring, and a shoulder to meet the flange of the inner ring $b$. Within F I screw a tubular flanged section, $g$, so as to form a raceway for a flange, $i$, of the loose ring D, provided with internal screw-threads $d$. This ring may be turned in either direction without disturbing other parts of the coupling, when it is desired to unite or disconnect the lengths of hose.

Heretofore, leather and other hose have been attached to the outer side of rings scored or threaded to bite on the inner sides of the hose, and the outside of the hose about the ring has been wound with wire, and in fastening the coupling to that class of hose known as textile, and lined with rubber, and also rubber hose, it has been customary to introduce into the interior of the hose a ring, screw-threaded on its outer side, and this ring has been fitted within an outside ring, the hose being grasped between them.

This method of confining the end of the hose to the coupling is very objectionable, for the screw-thread embeds itself into the rubber film or sheet which forms the internal lining of the hose, and displaces and cuts the rubber, and weakens it where the pressure is greatest, and this internal ring, as it must be screwed in tightly, has a tendency, owing to its friction, to disturb and loosen the hold of the rubber sheet or film on its adjacent fibrous material, and the parts thus separated or in a measure loosened are more accessible to water, and when wet soon rot and lose strength, and the hose is weakened at that point. By loosening the contact between the lining and the adjacent textile sheet the parts are liable, when the hose is subjected to great strain, to move one on the other and draw out of the holding-rings.

With my improvement there is no screw-thread to engage or touch the rubber lining, and when forming the connection between the hose and the coupling the parts are not turned, and there is therefore no liability of detaching the interior rubber lining from the textile portion of the hose.

My coupling may be applied to any known form of hose. Some of the textile hose, rubber-lined, has a lapped or sewed seam, as in the well-known Boyd and Blake hose. For this class of hose I form a longitudinal channel, $a^3$, in the interior of the binding-ring A, to receive this lap or seam-like portion thicker than the other parts of the hose. This channel may be serrated or not, as desired, so as to present a better holding-surface than if left plain, and the whole of the inner portion of the ring A might be roughened or provided with projections to engage the fibrous part of the hose or its outer surface.

The hose is cut in suitable lengths. One end, E, is placed within the binding-ring A, supported in holding-jaws, suitable rubber cement being placed, if desired, between the ring and the hose. Then the inner ring B is inserted within the hose, cement being used, if desired, between the ring and the inner rubber lining. This inner ring is preferably small enough to enter the hose without forcing, and its flange $b'$ meets the ring A and forms a cap or cover, which prevents water from coming in contact with the fiber at the end of the hose. In this position a tool, suitably formed to act as an expander, is forced within the ring B, and, by a series of such operations, the ring B is expanded from substantially the position shown in full to substantially the position shown in dotted lines, Fig. 1, and, so expanded, the hose is held firmly and pinched tightly between the two rings.

The outer or binding piece A is smaller in diameter at its end $x$ than it is at its other or screw end. In practice, a coupling of the size represented will differ at its ends about one-eighth of an inch.

The expander first acts to expand the ring B, so that it nips the hose closely between the ends $b\ x$. Then the ring B is gradually expanded and set closer and closer onto the hose, and the end of the hose elongates under pressure toward the flange $b'$, in the enlarged space provided for it between the rings A and B, and increasing in size toward flange $b'$. This action allows the process of expansion to be carried on without disturbing the position of the hose or of the expanding-ring. The inner or expansible ring is flanged at its largest end. The flange, by resting against the binding-ring, prevents longitudinal movement of the inner ring under the action of the expanders, and the ring is expanded uniformly throughout its length. The face of the flange $b'$ may be recessed, as shown at the left in Fig. 1, to receive a packing, and so also might be the end of the ring A where it meets the flange $b'$.

The mechanism for expanding this inner ring I do not claim in this application, as it forms the subject-matter of another application.

Should the coupling parts C and F D of the hose become jammed or broken it is only necessary to unscrew them from the hose-holding parts A B, these parts, when once fitted, always remaining on the hose.

Instead of expanding the inner ring B, I may apply sufficient force to the binding-ring A to shut or compress it circumferentially, or from the full to the dotted lines, (see $i'$, Fig. 1,) and in this way the hose is held or griped between the binding and inner ring by compression rather than by expansion. A machine for compressing this outer or binding ring will form the subject-matter of another application for patent.

It is well known that hose are most apt to break or burst at the couplings, due probably to the contraction of the water-way at that point, and it is therefore very necessary to hold the hose at that point very firmly, and by a coupling that will not disturb or weaken the material, as by screw-threads.

I am also aware that a cylindrical unflanged inner ring has been placed within a binding or outer ring provided with lugs, and between these two rings hose have been held by expanding the inner cylinder; but in such case a water-tight joint was not made, and the expanding-tool could not move from the outside into the hose or inner ring, and the running or coupling sections were not removable from the outer or binding rings.

The binding-rings A are provided with external screw-threads $a$, for the attachment of the screw-threaded coupling-sections C and F D, the binding-rings A and inner rings B being positively and immovably connected with the hose ends by contraction or expansion, and the coupling-sections may at any time be disconnected or removed from the hose-holding parts A B without disturbing the connection of the latter with the ends of the hose. The inner flanged ring does not act as a holder for the coupling-section, and it is not connected directly with the coupling-sections.

I do not herein claim a tail-piece provided with an external shoulder and a threaded extension, to receive a coupling-section, an outer ring being arranged to meet the shoulder of the tail-piece.

Having described my invention, I claim—

1. The combination, with the binding-ring, of the flanged inner ring, constructed and arranged with relation to each other, substantially as described, to afford a larger space between them toward the center than toward the ends of the coupling, for the purpose described.

2. The combination, with the hose, of an externally screw-threaded binding-ring adapted to receive the running-section, and a loose inner flanged ring, substantially as described, the hose being held between and by expanding or contracting the inner or outer rings, substantially as described.

3. The combination of the flanged inner ring, adapted to be expanded against the hose, with an outer or binding ring having external screw-threads, and with a removable screw-ring, substantially as set forth.

4. The loose ring D, combined with the threaded binding-ring, the removable screw-ring, and the removable screw-threaded flanged section, substantially as described.

5. The binding or hose-receiving ring, having a longitudinal space to receive the lap or seam of the hose, substantially as described.

6. The combination, with the outer and inner rings A B A B, positively secured to different pieces of hose by expansion or contraction, of coupling-sections C and F D, provided with screw-threads $c^1 d$, and each connected, through screw-threads, with the outer or binding rings, and removable therefrom without destroying the connection of the outer and inner rings with the hose, substantially as described.

7. The combination of the screw-threaded binding-ring, adapted to sustain the flange of the inner ring, and a coupling-section provided with a shoulder, $c^2$, to meet the outside of the flange and the end of the inner ring, with the flanged tapering and expansible inner ring, substantially as described.

In testimony whereof I have signed my name to this specification in the presence of two subscribing witnesses.

ANDREW J. MORSE.

Witnesses:
G. W. GREGORY,
L. H. LATIMER.